(12) United States Patent
Togasaki et al.

(10) Patent No.: US 11,067,798 B2
(45) Date of Patent: Jul. 20, 2021

(54) HEAD-UP DISPLAY DEVICE

(71) Applicant: DENSO CORPORATION, Kariya (JP)

(72) Inventors: Yu Togasaki, Kariya (JP); Takahiro Nambara, Kariya (JP)

(73) Assignee: DENSO CORPORATION, Kariya (JP)

( * ) Notice: Subject to any disclaimer, the term of this patent is extended or adjusted under 35 U.S.C. 154(b) by 105 days.

(21) Appl. No.: 15/744,407

(22) PCT Filed: Sep. 13, 2016

(86) PCT No.: PCT/JP2016/076884
§ 371 (c)(1),
(2) Date: Jan. 12, 2018

(87) PCT Pub. No.: WO2017/086002
PCT Pub. Date: May 26, 2017

(65) Prior Publication Data
US 2018/0210201 A1    Jul. 26, 2018

(30) Foreign Application Priority Data
Nov. 19, 2015  (JP) .............................. JP2015-226956

(51) Int. Cl.
*G02B 27/01*  (2006.01)
*B60K 35/00*  (2006.01)
(Continued)

(52) U.S. Cl.
CPC .......... *G02B 27/0101* (2013.01); *B60K 35/00* (2013.01); *G02F 1/133528* (2013.01);
(Continued)

(58) Field of Classification Search
None
See application file for complete search history.

(56) References Cited

U.S. PATENT DOCUMENTS

| | | | |
|---|---|---|---|
| 6,088,067 A | 7/2000 | Willett et al. | |
| 2007/0064174 A1* | 3/2007 | Kitamura | ............. G02B 3/0056 349/69 |

(Continued)

FOREIGN PATENT DOCUMENTS

| | | |
|---|---|---|
| JP | 11508701 A | 7/1999 |
| JP | 2003322848 A | 11/2003 |

(Continued)

*Primary Examiner* — Jessica M Merlin
*Assistant Examiner* — Mark D Teets
(74) *Attorney, Agent, or Firm* — Harness, Dickey & Pierce, P.L.C.

(57) ABSTRACT

A head-up display device that displays a virtual image to be viewable by an occupant in a movable body includes: a light source part which emits light source light; a liquid crystal panel integrally having a pair of polarizers for liquid crystals and a liquid crystal layer disposed between the polarizers in a stacked state; and an additional polarizer arranged in an optical path between the light source part and the liquid crystal panel. The additional polarizer and the pair of polarizers for liquid crystals have properties of transmitting polarized light along a transmission axis and shielding polarized light along a shielding axis which intersects the transmission axis. The additional polarizer is arranged such that the transmission axis and the shielding axis respectively match those of a polarizer for liquid crystals adjacent to the light source part, of the pair of polarizers for liquid crystals.

16 Claims, 6 Drawing Sheets

(51) Int. Cl.
*G02F 1/1335* (2006.01)
*G02F 1/13357* (2006.01)

(52) U.S. Cl.
CPC .. *G02F 1/133536* (2013.01); *G02F 1/133606* (2013.01); *B60K 2370/155* (2019.05); *B60K 2370/31* (2019.05); *B60K 2370/334* (2019.05); *G02B 2027/0118* (2013.01); *G02F 1/133607* (2021.01)

(56) References Cited

U.S. PATENT DOCUMENTS

| | | |
|---|---|---|
| 2014/0022645 A1 | 1/2014 | Matsuura et al. |
| 2014/0184996 A1* | 7/2014 | Matsushita ........ G02B 27/0101 349/117 |
| 2014/0254195 A1 | 9/2014 | Toyooka et al. |
| 2016/0147061 A1 | 5/2016 | Nambara |
| 2016/0299341 A1 | 10/2016 | Yoshida et al. |
| 2017/0146798 A1* | 5/2017 | Nambara ................ F21V 5/008 |
| 2018/0045961 A1* | 2/2018 | Jang ....................... G02B 26/08 |
| 2019/0056588 A1* | 2/2019 | Nambara ........... G02B 17/0621 |
| 2019/0171010 A1* | 6/2019 | Nambara ................. F21V 5/04 |

FOREIGN PATENT DOCUMENTS

| | | | |
|---|---|---|---|
| JP | 2007086387 A | 4/2007 |
| JP | 2009157210 A | 7/2009 |
| JP | 2012203176 A | 10/2012 |
| JP | 2013025953 A | 2/2013 |
| JP | 2014238477 A | 12/2014 |
| JP | 2015004825 A | 1/2015 |
| JP | 2015118272 A | 6/2015 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2016/076884 filed on Sep. 13, 2016 and published in Japanese as WO 2017/086002 A1 on May 26, 2017. This application is based on and claims the benefit of priority from Japanese Patent Application No. 2015-226956 filed on Nov. 19, 2015. The entire disclosures of all of the above applications are incorporated herein by reference.

TECHNICAL FIELD

The present disclosure relates to a head-up display device (hereafter referred to as HUD device) that displays a virtual image to be viewable by an occupant in a movable body.

BACKGROUND ART

Conventionally, a head-up display device is known, which displays a virtual image to be viewable by an occupant in a movable body. A HUD device disclosed in Patent Literature 1 includes a light source part which emits light source light, and a liquid-crystal display element which forms a picture by making a part of the light source light to pass through.

The liquid-crystal display element has a liquid crystal layer between a pair of polarizers for liquid crystals. Each of the polarizers for liquid crystals is spaced from the liquid crystal layer.

PRIOR ART LITERATURES

Patent Literature

Patent Literature 1: JP 2007-86387 A

SUMMARY OF INVENTION

When the polarizer for liquid crystals is arranged through a space relative to the liquid crystal layer, for example, even if the light source light shielded by the polarizer for liquid crystals is changed into heat, the space can restrict a rise in the temperature of the liquid crystal layer such that the durability of HUD device improves. However, the quality (for example, contrast) of the picture formed by the liquid-crystal display element may deteriorate due to the space.

It is an object of the present disclosure to provide a HUD device with high durability, while deterioration in the quality of a picture can be restricted.

According to an aspect of the present disclosure, a head-up display device that displays a virtual image by projecting a picture to a projection component to be viewable by an occupant in a movable body includes: a light source part which emits light source light; a liquid crystal panel integrally having a pair of polarizers for liquid crystals and a liquid crystal layer disposed between the polarizers in a stacked state, to form the picture by making a part of the light source light to pass through; and an additional polarizer arranged in an optical path between the light source part and the liquid crystal panel. The additional polarizer and the pair of polarizers for liquid crystals have properties of transmitting polarized light along a transmission axis and shielding polarized light along a shielding axis which intersects the transmission axis. The additional polarizer is arranged such that the transmission axis and the shielding axis are respectively aligned with those of a polarizer for liquid crystals adjacent to the light source part, of the pair of polarizers for liquid crystals.

Thus, in the liquid crystal panel, the pair of the light polarizers for liquid crystals and the liquid crystal layer between the light polarizers for liquid crystals are prepared as one-piece in the stacked state. The additional light polarizer is arranged in the optical path between the light source part and the liquid crystal panel. Due to the arrangement, among the light source light from the light source part, the polarized light along the shielding axis of the additional light polarizer is shielded by the additional light polarizer before reaching the liquid crystal panel. That is, the polarized light along the transmission axis of the additional light polarizer travels toward the liquid crystal panel, of the light source light.

Since the additional light polarizer and the light polarizer for liquid crystals adjacent to the light source part are arranged such that transmission axis and the shielding axis are made common therebetween, the light source light passing through the additional light polarizer, which is a polarized light along the transmission axis, is hardly shielded by the light polarizer for liquid crystals adjacent to the light source part, and a picture is formed. In this way, while restricting the rise in temperature of the liquid crystal panel caused by conversion of the light source light into heat in the light polarizer for liquid crystals adjacent to the light source part, a picture can be formed with the liquid crystal panel in the stacked state. Accordingly, the HUD device with high durability can be offered while restricting deterioration in the quality of a picture.

DESCRIPTION OF EMBODIMENTS

Figure 1:
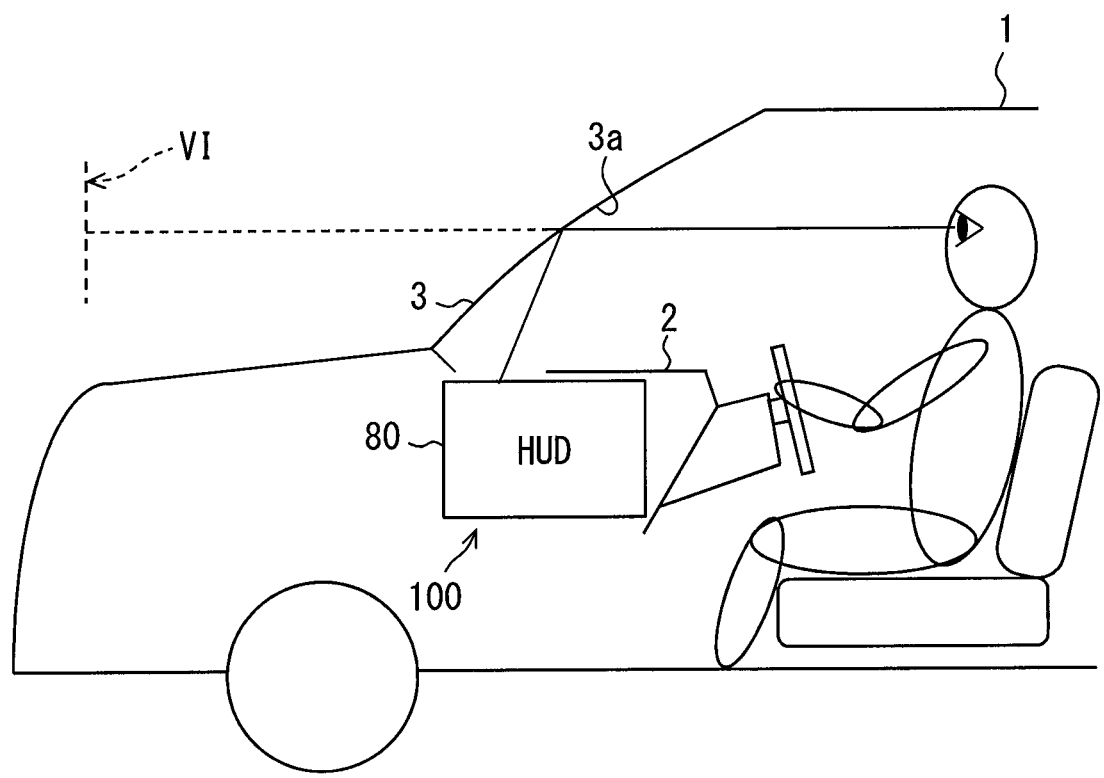
FIG. 1 is a schematic view illustrating a HUD device according to a first embodiment, which is disposed in a vehicle.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As shown in FIG. 1, a HUD device 100 according to a first embodiment is disposed in a vehicle 1 which is a kind of movable body, and is housed in an instrument panel 2. The HUD device 100 projects a picture to a windshield 3 which is a projection component of the vehicle 1. When the light of picture is reflected by the windshield 3, the HUD device 100 displays a virtual image to be viewable by an occupant of the vehicle 1. That is, the light of picture reflected by the windshield 3 reaches an eye of the occupant in the interior of the vehicle 1, and the occupant perceives the light of picture as a virtual image VI. The occupant can recognize a variety of information according to the virtual image VI. The variety of information displayed as the virtual image include, for example, vehicle status values such as speed and fuel residual quantity, or navigation information such as road information, field-of-view supplementary information.

The windshield 3 of the vehicle 1 is formed in tabular and is made of translucent glass or synthetic resin. The internal surface of the windshield 3 defines a projection surface 3a where a picture is projected, and is shaped in a curved concave surface or in a flat plane. Instead of the windshield 3, as a projection component, a combiner which is produced separately from the vehicle 1 may be installed in the vehicle 1, and a picture may be projected to the combiner.

Figure 2:
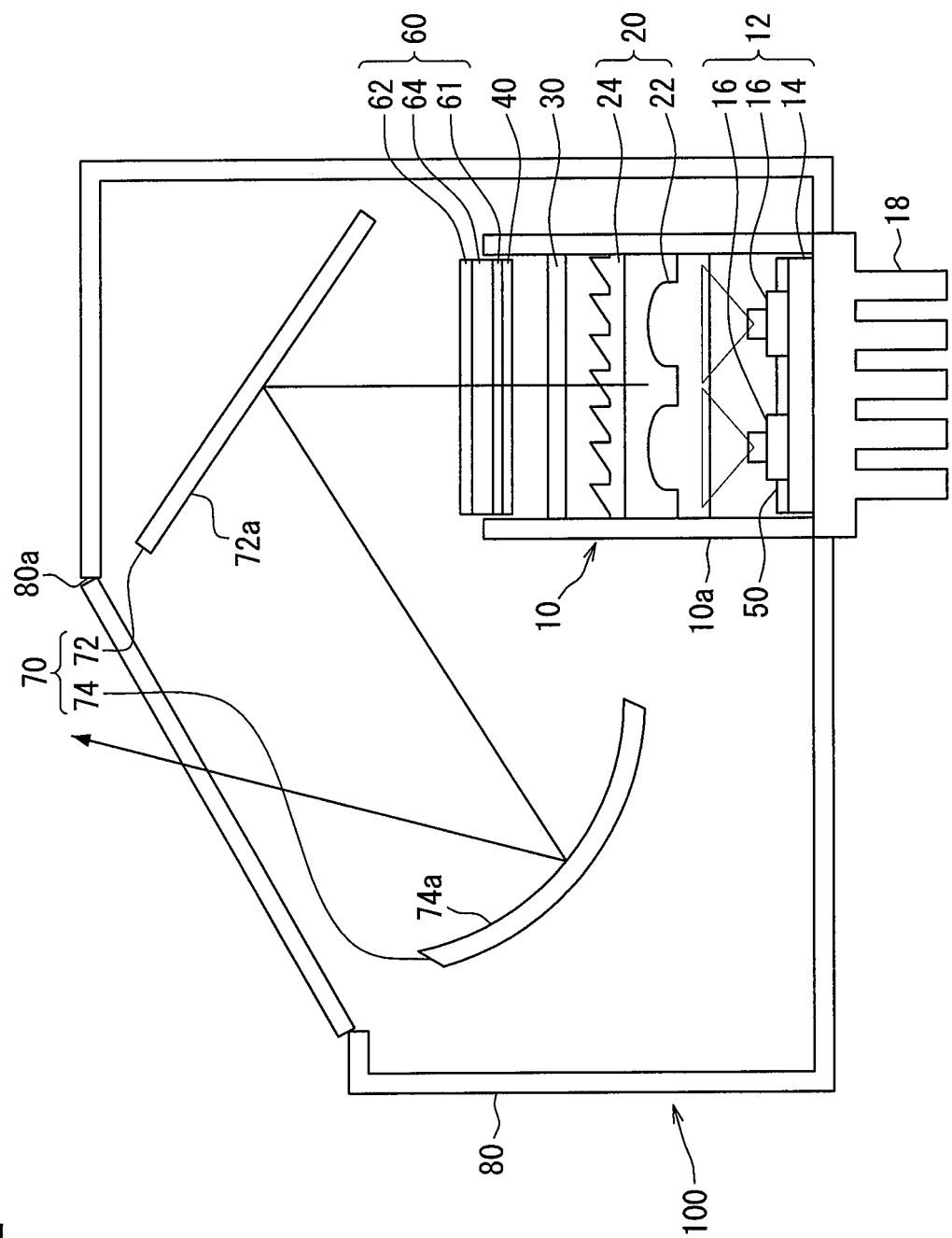
FIG. 2 is a schematic view illustrating the HUD device of the first embodiment.

The specific configuration of the HUD device 100 is explained below based on FIGS. 2-6. As shown in FIG. 2, the HUD device 100 includes a light source part 12, a condensing part 20, a diffusion part 30, a light polarizer 40, a reflective part 50, a liquid crystal panel 60, and a light introducing part 70, which are housed and held by a housing 80. The light source part 12, the condensing part 20, the diffusion part 30, the light polarizer 40, the reflective part 50, and the liquid crystal panel 60 are further housed in a projector case 10a to define a projection machine 10. The projection machine 10 projects a picture towards the windshield 3 through the light introducing part 70 by making a part of the light source light from the light source part 12 to pass through the liquid crystal panel 60.

The light source part 12 has a circuit board 14 for light sources, and plural light emitting elements 16. The circuit board 14 for light sources electrically connects a power supply to each of the light emitting elements 16 through a circuit pattern defined on the board 14. Each of the light emitting elements 16 is a light emitting diode element, and emits light source light with the amount of luminescence according to the amount of current. In each of the light emitting elements 16, for example, luminescence in false white is realized by covering a blue light-emitting diode with a phosphor. The light source light emitted by each of the light emitting elements 16 is random polarized light. A radiating fin 18 is disposed opposite to the light emitting element 16 through the circuit board 14 for light sources, and is exposed from the projector case 10a and the housing 80.

In this way, the light source light emitted by the light source part 12 enters the condensing part 20, and is condensed by the condensing part 20.

As shown in FIG. 2, the condensing part 20 is arranged in the optical path between the light source part 12 and the liquid crystal panel 60, and has a condenser lens 22 and a field lens 24.

Figure 3:
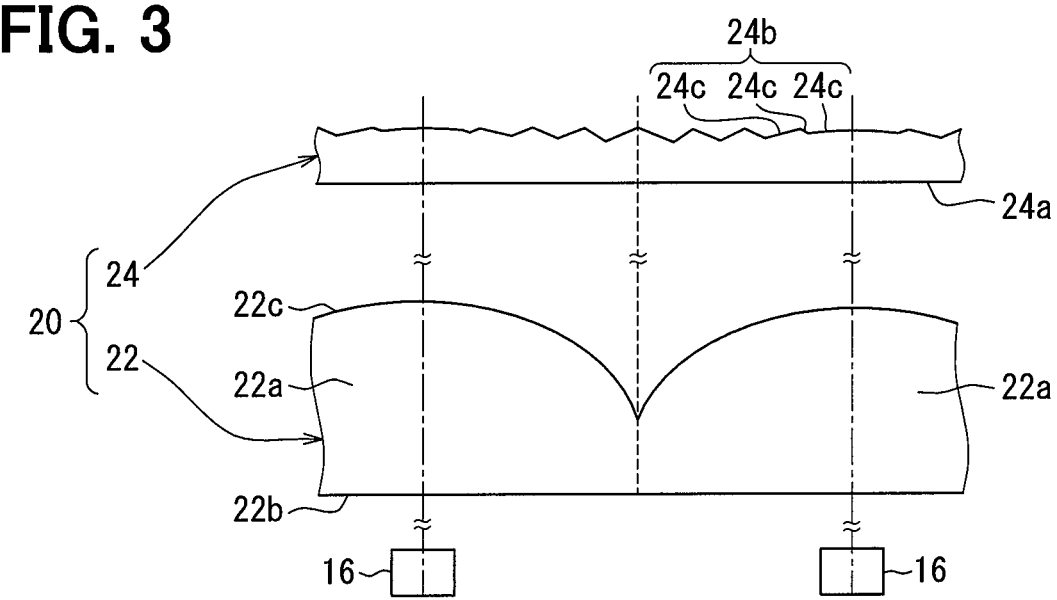
FIG. 3 is an enlarged view illustrating a condensing part in the first embodiment.

The condenser lens 22 shown in FIG. 3 is arranged to oppose the light source part 12, in the condensing part 20, and is a translucent lens made of synthetic resins such as acrylic resin. The condenser lens 22 is a lens array in which lens elements 22a are arranged, and the number of the lens elements 22a is the same as the light emitting elements 16. The lens elements 22a are arranged to oppose the corresponding light emitting elements 16, respectively. Each of the lens elements 22a has a first refraction side 22b at a side adjacent to the light source part 12 as a single plane common among the lens elements 22a. Each of the lens elements 22a further has a second refraction side 22c at a side adjacent to the liquid crystal panel 60, and the second refraction side 22c has an individual smooth convex shape.

The light source light condensed by the refraction action of the condenser lens 22 enters into the field lens 24.

The field lens 24 is, for example, a translucent lens made of synthetic resins such as an acrylic resin, and is arranged between the condenser lens 22 and the liquid crystal panel 60 in the condensing part 20. The field lens 24 is a composite type Fresnel lens. Specifically, the field lens 24 has an incidence optical surface 24a shaped in a smooth single plane at a side adjacent to the condenser lens 22. Moreover, the field lens 24 has a composite optical surface 24b where divided optical surfaces 24c continue at a side adjacent to the liquid crystal panel 60. In FIG. 3, the reference numeral 24b is given to a part of the composite optical surfaces 24b, and the reference numeral 24c is given to a part of the divided optical surfaces 24c.

The condenser lens 22 and the field lens 24 have non-intentional phase difference characteristic due to the remaining stress produced when fabricating.

The light source light condensed by the refraction action of the condenser lens 22 and the field lens 24 enters the diffusion part 30.

As shown in FIG. 2, the diffusion part 30 is located in the optical path between the light source part 12 and the liquid crystal panel 60. In this embodiment, the diffusion part 30 is arranged in the optical path between the condensing part 20 and the light polarizer 40. The diffusion part 30 is formed in a plate shape, and is made of synthetic resins such as polyester resin. The diffusion part 30 includes a translucent board and a large number of the spherical beads, which have variation in diameters of particles, fixed on the surface of the translucent board. The light source light entering the diffusion part 30 is diffused by the diffusion action of the beads, and enters the light polarizer 40.

The light polarizer 40 is in the optical path between the light source part 12 and the liquid crystal panel 60. In this embodiment, the light polarizer 40 is arranged in the optical path between the condensing part 20 and the diffusion part 30, and the liquid crystal panel 60. In other words, the light polarizer 40 is located adjacent to the liquid crystal panel 60 than the condensing part 20 and the diffusion part 30. The light polarizer 40 has properties of transmitting polarized light along the transmission axis 40a and shielding polarized light along the shielding axis 40b which intersects the transmission axis 40a (also see FIG. 6). The light polarizer 40 of the first embodiment is a reflection type light polarizer which reflects polarized light along the shielding axis 40b.

Specifically, the light polarizer 40 is a wire grid polarizer as the reflection type light polarizer. The light polarizer 40 is formed in the shape of a film, and plural wires made of metal such as aluminum are arranged in parallel at a predetermined pitch in a direction along the film surface. The predetermined pitch is set to be smaller than a wavelength of the light source light, for example, as about 100-200 nm. In the light polarizer 40, the stretching direction of the metal wire corresponds to the transmission axis 40a, and the arrangement direction of the metal wires corresponds to the shielding axis 40b.

As the reflection type light polarizer, instead of the wire grid polarizer, a light polarizer which reflects polarized light along the shielding axis 40b may be adopted, in which plural optical films are stacked to produce interferential actions.

A part of the light source light along the transmission axis 40a passes through the light polarizer 40, and a part of the light source light along the shielding axis 40b is reflected by the light polarizer 40 toward the light source part 12.

The reflective part 50 is arranged adjacent to the light source part 12 than the light polarizer 40. In the first embodiment, the reflective part 50 is arranged adjacent to the light source part 12 than the condensing part 20 and the diffusion part 30. Specifically, the reflective part 50 is formed by sticking a reflective film on a part of surfaces of the circuit board 14 for light sources opposing the liquid crystal panel 60, except the area of the light emitting element 16. The reflective part 50 reflects the light source light reflected toward the light source part 12 by the light polarizer 40, again toward the liquid crystal panel 60.

Here, the light source light which reaches the light polarizer 40 again by being reflected by the reflective part 50 passes through the diffusion part 30 and the condensing part 20 twice, respectively by going back and forth between the light polarizer 40 and the reflective part 50. When the light source light under the round trip passes through the diffusion part 30, the light source light receives the depolarization action simultaneously as the diffusion action. When the light source light under the round trip passes through the condensing part 20, the polarization state is changed variously depending on the transmission course by the influence of the above-mentioned phase difference characteristic caused by the remaining stress, and the influence of a polarized light aberration produced simultaneously as the refraction action.

Therefore, when the light source light, which was the polarized light along the shielding axis 40b at a time of reflection with the light polarizer 40, reaches the light polarizer 40 again through the reflective part 50, the light source light comes to include a polarized light along the transmission axis 40a. In this way, of the light source light which reached the light polarizer 40 again, a part of the polarized light along the transmission axis 40a passes through the light polarizer 40.

Figure 4:
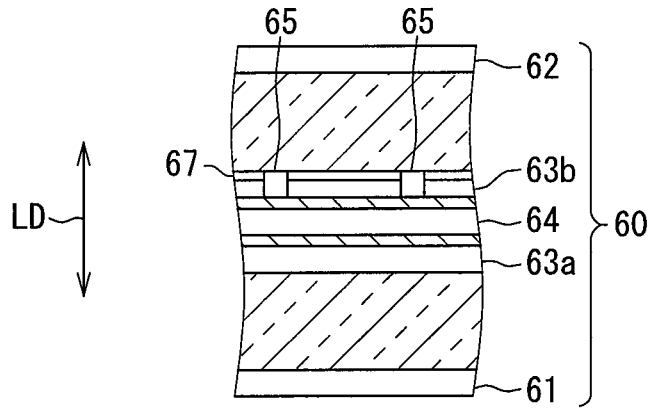
FIG. 4 is an enlarged sectional view illustrating a liquid crystal panel in the first embodiment.
Figure 5:
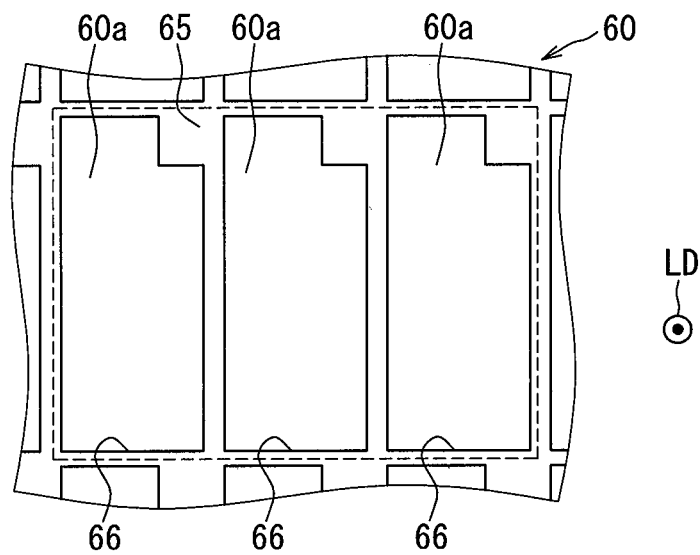
FIG. 5 is an enlarged plan view illustrating the liquid crystal panel in the first embodiment.

As shown in FIGS. 2, 4, and 5, the liquid crystal panel 60 is produced by using a thin film transistor (Thin Film Transistor, TFT), such as active-matrix type liquid crystal panel formed from plural liquid crystal pixels 60a arranged in two dimensional direction. The liquid crystal panel 60 integrally includes a pair of the light polarizers 61 and 62 for liquid crystals, and a liquid crystal layer 64 disposed between the light polarizers 61 and 62 for liquid crystals in a stacked state.

Figure 6:
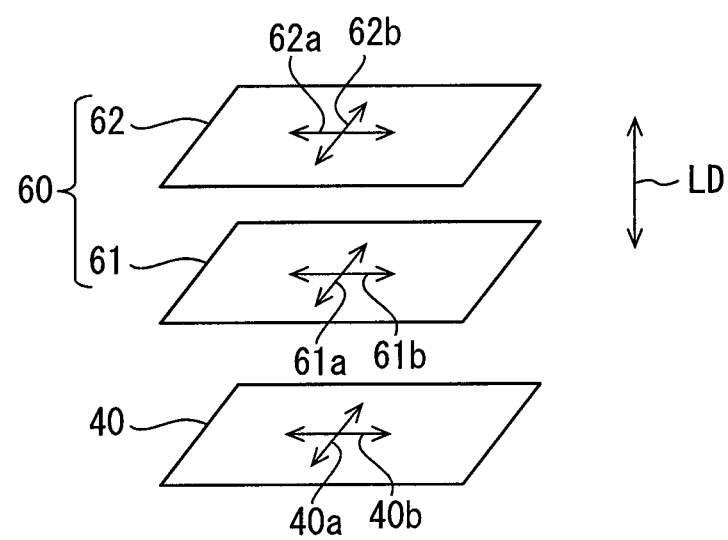
FIG. 6 is a schematic view illustrating arrangement of a pair of polarizers for liquid crystals and an additional polarizer in the first embodiment.

As shown in FIG. 6, of the pair of light polarizers 61 and 62 for liquid crystals, the light polarizer 61 for liquid crystals adjacent to the light source part 12 has properties of transmitting the polarized light along the transmission axis 61a and shielding the polarized light along the shielding axis 61b which intersects the transmission axis 61a. Similarly, the light polarizer 62 for liquid crystals adjacent to the windshield 3 (namely, adjacent to the light introducing part 70) also has properties of transmitting the polarized light along the transmission axis 62a and shielding the polarized light along the shielding axis 62b which intersects the transmission axis 62a. The pair of light polarizers 61 and 62 for liquid crystals are arranged such that the transmission axes 61a and 62a are substantially perpendicular to each other. Each of the light polarizers 61 and 62 for liquid crystals is an absorbing type light polarizer which absorbs polarized light along the shielding axis 61b, 62b.

Specifically, each of the light polarizers 61 and 62 for liquid crystals is an absorbing type light polarizer formed by adding iodine which is dichroism pigment to polyvinyl alcohol. Each of the light polarizers 61 and 62 for liquid crystals has the transmission axis 61a, 62a and the shielding axis 61b, 62b which are substantially perpendicular to each other, due to the iodine molecular orientation.

The light polarizer 61 for liquid crystals adjacent to the light source part 12 is arranged relative to the light polarizer 40, such that the transmission axes 61a and 40a match with each other, and that the shielding axes 61b and 40b match with each other. In this embodiment, in case where the light polarizer 61 for liquid crystals and the light polarizer 40 are seen in a stacking direction LD which defines the thickness of the liquid crystal panel 60, the arrangement is set so that the transmission axes 61a and 40a exactly overlap with each other.

The polarized light of the light source light passing through the light polarizer 40 is along the transmission axis 40a, and further passes through the light polarizer 61 for liquid crystals with high transmissivity as it is. In other words, the polarized light along the shielding axis 61b hardly enters the light polarizer 61 for liquid crystals. In this embodiment, as shown in FIG. 2, the light polarizer 40 is stuck with the liquid crystal panel 60 without a gap.

Moreover, as shown in FIG. 4, the liquid crystal panel 60 has a pair of transparent electrodes 63a and 63b. The transparent electrode 63a is between the light polarizer 61 and the liquid crystal layer 64, and the transparent electrode 63b is between the light polarizer 62 and the liquid crystal layer 64. The liquid crystal layer 64 is between the transparent electrode 63a and the transparent electrode 63b. The liquid crystal layer 64 is filled with a solution in which the main ingredient is liquid crystal molecules such as nematic liquid crystal. A voltage is applied between the pair of transparent electrodes 63a and 63b in each of the liquid crystal pixels 60a to control the molecular orientation of liquid crystal. Thus, it is possible to change the polarization direction of the light source light passing through the liquid crystal layer 64 according to the applied voltage in the liquid crystal layer 64.

The thickness of the liquid crystal layer 64 is set up so that the polarization direction of the light perpendicularly entering in the stacking direction LD of the liquid crystal panel 60 changes by 90 degrees after passing through the liquid crystal layer 64, in case a predetermined voltage (for example, 0V) corresponding to the maximum transmissivity is applied. Since the polarization direction of light source light changes by 90 degrees between the light polarizers 61 and 62 for liquid crystals, the light source light can pass through the light polarizer 62 for liquid crystals adjacent to the windshield 3.

Moreover, as shown in FIG. 5, each of the liquid crystal pixels 60a defines a wiring part 65 which is a portion not forming a picture, and an opening 66 which can form a picture. The opening 66 is opened and surrounded by the wiring part 65. Moreover, a color filter 67 for forming a color image is also stacked in the liquid crystal panel 60.

The transmissivity of the incident light source light is controlled by controlling the applied voltage in each of the liquid crystal pixels 60a. Therefore, the liquid crystal panel 60 can form a picture by making a part of the light source light to pass through.

As shown in FIG. 2, the light of the projected picture is introduced into the light introducing part 70, because a portion of the liquid crystal panel 60 adjacent to the light introducing part 70 is exposed in the projector case 10a. The light introducing part 70 is an optical system which introduces the light of the picture from the projection machine 10 toward the windshield 3. The light introducing part 70 has a plane mirror 72 and a concave mirror 74.

The plane mirror 72 is formed, for example, by vapor-depositing aluminum as a reflective surface 72a on the surface of the base material made of synthetic resin or glass. The reflective surface 72a is provided on the side opposing the liquid crystal panel 60 and the concave mirror 74, and is formed in the shape of a flat plane. The plane mirror 72 reflects the light of the picture from the liquid crystal panel 60 toward the concave mirror 74.

The concave mirror 74 is formed, for example, by vapor-depositing aluminum as a reflective surface 74a on the surface of the base material made of synthetic resin or glass. The reflective surface 74a is provided on the side opposing the plane mirror 72 and the windshield 3, and is formed in the shape of a smooth curved surface where the center of the concave mirror 74 is recessed. The concave mirror 74 reflects the light of the picture from the plane mirror 72 towards the windshield 3 through an opening 80a defined in the housing 80.

The action and effect of the first embodiment described above is explained below.

According to the first embodiment, the liquid crystal panel 60 integrally includes the pair of the light polarizers 61 and 62 for liquid crystals and the liquid crystal layer 64 between the light polarizers 61 and 62 for liquid crystals in the stacked state. The additional light polarizer 40 is arranged in the optical path between the light source part 12 and the liquid crystal panel 60. Due to the arrangement, of the light source light from the light source part 12, the polarized light along the shielding axis 40b of the additional light polarizer 40 is shielded by the additional light polarizer 40 before reaching the liquid crystal panel 60. That is, the polarized light along the transmission axis 40a of the additional light polarizer 40 travels toward the liquid crystal panel 60, of the light source light.

The additional light polarizer 40 and the light polarizer 61 for liquid crystals adjacent to the light source part 12 are arranged such that the transmission axes 40a and 61a match with each other and that the shielding axes 40b and 61b match with each other. Therefore, the light source light passing through the additional light polarizer 40, which is a polarized light along the transmission axis 40a, is hardly shielded by the light polarizer 61 for liquid crystals adjacent to the light source part 12, and a picture is formed. In this way, a picture can be formed with the liquid crystal panel 60 in the stacked state while a rise in temperature of the liquid crystal panel 60 can be restricted, which is caused by conversion from the light source light to heat, in the light polarizer 61 for liquid crystals adjacent to the light source part 12. By the above, the HUD device 100 with high durability can be offered, while controlling deterioration in the quality of a picture.

Moreover, according to the first embodiment, the additional light polarizer 40 is arranged in the optical path between the diffusion part 30 and the liquid crystal panel 60. Therefore, even if the polarized light of the light source light diffused by the diffusion part 30 is disturbed simultaneously with the diffusion action, the polarized light passing through the additional light polarizer 40 becomes suitable for the light polarizer 61 for liquid crystals adjacent to the light source part 12 and enters the light polarizer 61 for liquid crystals. Thus, the rise in temperature of the liquid crystal panel 60 can be restricted, which is caused by conversion from the light source light to heat in the light polarizer 61 for liquid crystals. In this way, the durability of the HUD device 100 can be improved, while raising the quality of a picture using the diffusion.

Moreover, according to the first embodiment, the additional light polarizer 40 is arranged in the optical path between the condensing part 20 and the liquid crystal panel 60. Therefore, even if a polarized light aberration etc. occurs to the light source light condensed by the condensing part 20 simultaneously with the condensing action, the light source light passing through the additional light polarizer 40 becomes a polarized light suitable for the light polarizer 61 for liquid crystals adjacent to the light source part 12 and enters the light polarizer 61 for liquid crystals. Thus, the rise in temperature of the liquid crystal panel 60 can be restricted, which is caused by conversion from the light source light to heat in the light polarizer 61 for liquid crystals. In this way, the durability of the HUD device 100 can be improved, while raising the quality of a picture using the condensing.

Moreover, according to the first embodiment, the additional light polarizer 40 is the reflection type light polarizer which reflects the polarized light along the shielding axis 40b toward the light source part 12. Therefore, the conversion from the light source light to heat around the liquid crystal panel 60 can be restricted by the reflection toward the light source part 12.

Moreover, according to the first embodiment, the reflective part 50 is arranged adjacent to the light source part 12 than the additional light polarizer 40, to reflect the light source light reflected by the additional light polarizer 40, again toward the liquid crystal panel 60. A part of the light source light reflected by the reflective part 50 can be reused by passing through the additional light polarizer 40, and the luminosity of a picture can be raised. In this way, the quality of a picture can be raised.

Moreover, according to the first embodiment, the additional light polarizer 40 is stuck with the liquid crystal panel 60. Therefore, increase in the number of components held at the HUD device 100 can be restricted even if adding the light polarizer 40.

Second Embodiment

Figure 7:
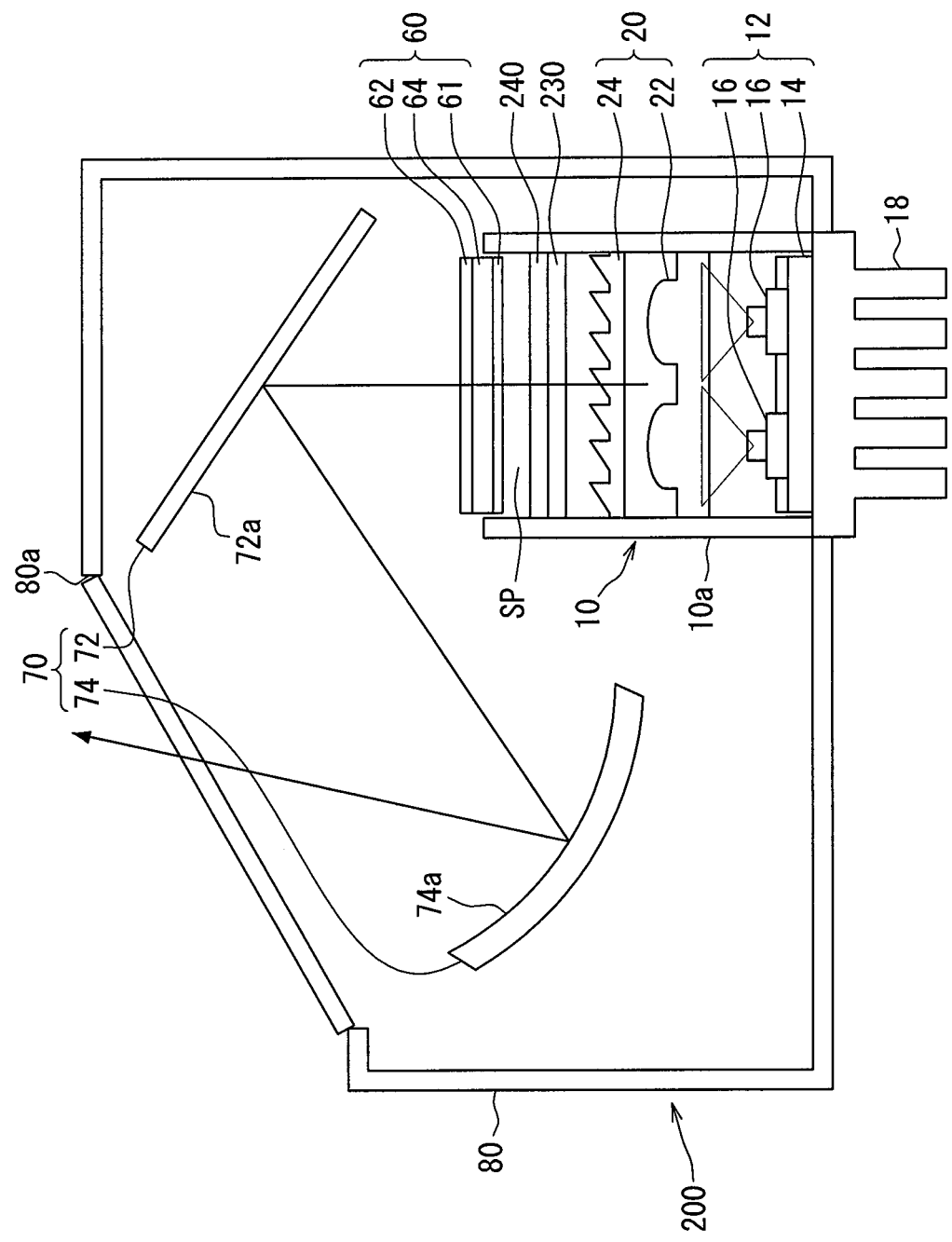
FIG. 7 is a view according to a second embodiment, which corresponds to FIG. 2.

As shown in FIG. 7, a second embodiment is a modification of the first embodiment. The second embodiment is described focusing on a point different from the first embodiment.

In the second embodiment, a light polarizer 240 corresponding to the light polarizer 40 is arranged in the optical path between the condensing part 20 and the diffusion part 230, and the liquid crystal panel 260, similarly to the first embodiment. In other words, the light polarizer 240 is arranged adjacent to the liquid crystal panel 260 than the condensing part 20 and the diffusion part 230. However, the light polarizer 240 is stuck on the diffusion part 230, and is arranged through the space SP relative to the liquid crystal panel 260.

Moreover, the light polarizer 240 is the absorbing type light polarizer which absorbs polarized light along the shielding axis 40b. Specifically, the light polarizer 240 is the absorbing type light polarizer formed by adding iodine which is dichroism pigment to polyvinyl alcohol, similarly to the pair of light polarizers 61 and 62 for liquid crystals. The light polarizer 240 has the transmission axis 40*a* and the shielding axis 40*b* approximately perpendicular to each other due to the iodine molecular orientation.

Further, the reflective part 50 is not formed in the HUD device 200 of the second embodiment.

According to the second embodiment, the light polarizer 240 is arranged to the light polarizer 61 for liquid crystals adjacent to the light source part 12, of the pair of light polarizers 61 and 62 for liquid crystals, such that the transmission axes 40*a* and 61*a* match with each other, and that the shielding axes 40*b* and 61*b* match with each other. Therefore, it becomes possible to obtain the action and effect similar to the first embodiment.

Moreover, according to the second embodiment, the additional light polarizer 240 is the absorbing type light polarizer which absorbs polarized light along the shielding axis 40*b*, and is arranged through the space SP relative to the liquid crystal panel 260. Since the space SP can make the heat of the light source light absorbed by the additional light polarizer 240 hard to get across to the liquid crystal panel 260, the durability of the HUD device 200 can be improved.

Other Embodiment

The present disclosure is not limited to the embodiments mentioned above, and can be applied to various embodiments and its combinations within the range of the disclosure not deviated from the scope.

Figure 8:
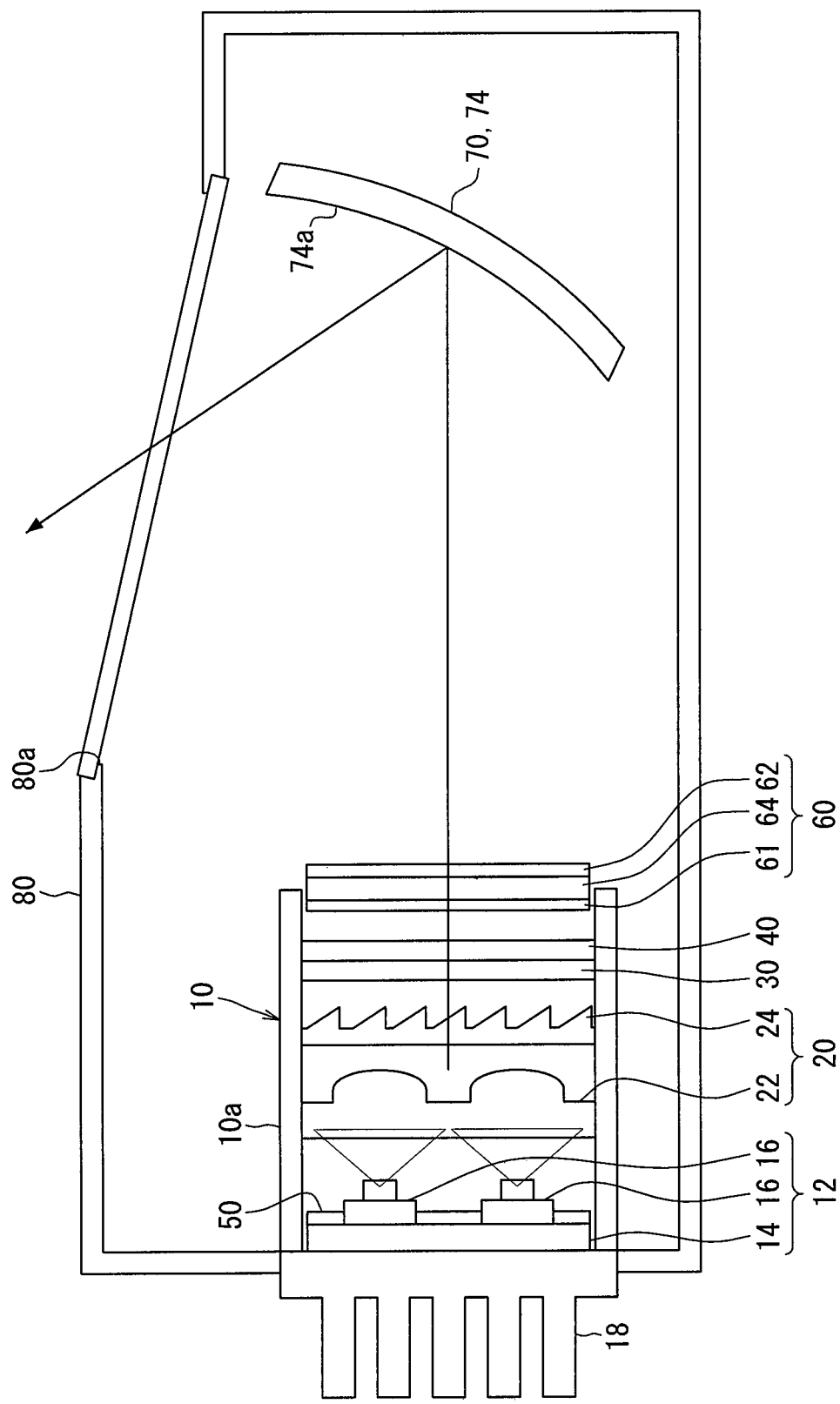
FIG. 8 is a view according to a first modification, which corresponds to FIG. 2.

Specifically, as a first modification, as shown in FIG. 8, the light introducing part 70 may have only the concave mirror 74, without having the plane mirror 72.

As a second modification, various optical elements such as a reflecting mirror, a lens, a prism, a polarizing plate, a retardation film, and an optical filter may be added to the light introducing part 70.

As a third modification, the additional light polarizer 240 of the second embodiment may be a reflection type light polarizer instead of the absorbing type light polarizer. Even when the additional light polarizer 240 is a reflection type light polarizer, the additional light polarizer 240 is stuck with the diffusion part 230, and is arranged to the liquid crystal panel 260 through the space SP. Even when the additional light polarizer 240 is a reflection type light polarizer, it is not always necessary to form the reflective part 50.

As a fourth modification, the additional light polarizer 40 may be formed in the shape of a board not stuck with the other components, and may be independently held at the projector case 10*a*.

As a fifth modification, the reflective part 50 may reflect the light source light reflected by the light polarizer 40 again toward the liquid crystal panel 60, by making a solder resist on the surface of the circuit board 14 for light sources to have bright color (for example, white).

As a sixth modification, the condensing part 20 that condenses the light source light from the light source part 12 may be one lens and may be a lens group including more than three lenses.

As a seventh modification, the HUD device 100 may not have at least one of the condensing part 20 and the diffusion part 30.

As an eighth modification, other drive systems other than the TN (Twisted Nematic) system, such as VA (Vertical Alignment) system, an IPS (In-Place-Switching) system, etc. are employable for the liquid crystal panel. Moreover, a passive-matrix type panel may be adopted as the liquid crystal panel.

As a ninth modification, the present disclosure may be applied to various movable bodies (transport machines) such as vessel or airplane other than the vehicle 1.

What is claimed is:

1. A head-up display device that displays a virtual image by projecting a picture to a projection component to be viewable by an occupant in a movable body, the head-up display device comprising:
   a light source part which emits light source light;
   a liquid crystal panel integrally having a pair of polarizers for liquid crystals and a liquid crystal layer disposed between the polarizers in a stacked state, to form the picture by making a part of the light source light to pass through;
   an additional polarizer arranged in an optical path between the light source part and the liquid crystal panel;
   a condenser lens arranged in the optical path between the light source part and the liquid crystal panel to condense the light source light;
   a field lens arranged in the optical path between the light source part and the liquid crystal panel, the field lens including a Fresnel lens having a composite optical surface; and
   a diffusion part arranged in the optical path between the light source part and the liquid crystal panel to diffuse the light source light, wherein
   the additional polarizer and the pair of polarizers for liquid crystals have properties of transmitting polarized light along a transmission axis and shielding polarized light along a shielding axis which intersects the transmission axis,
   the additional polarizer is arranged such that the transmission axis and the shielding axis respectively match with those of a polarizer for liquid crystals adjacent to the light source part, of the pair of polarizers for liquid crystals,
   the additional polarizer is a reflection type polarizer which reflects the polarized light along the shielding axis toward the light source part,
   the condenser lens, the field lens, the diffusion part, and the additional polarizer are arranged in this order from a side of the light source part in the optical path between the light source part and the liquid crystal panel, and
   the condenser lens has a refraction side facing the liquid crystal panel, and the refraction side of the condenser lens has a plurality of smooth convex shapes between which no flat surface is located.

2. The head-up display device according to claim 1, wherein
   the additional polarizer is arranged in the optical path between the diffusion part and the liquid crystal panel.

3. The head-up display device according to claim 1, wherein
   the additional polarizer is attached to the liquid crystal panel.

4. The head-up display device according to claim 1, further comprising:
   a reflective part arranged more adjacent to the light source part than the additional polarizer, wherein
   the reflective part reflects the light source light reflected by the additional polarizer toward the liquid crystal panel.

5. The head-up display device according to claim 1, wherein
the condenser lens changes a polarization state of the light source light depending on a transmission course of the light source light before reaching the additional polarizer after the light source light is reflected by a reflective part.

6. The head-up display device according to claim 1, wherein
the plurality of smooth convex shapes of the refraction side of the condenser lens correspond to a plurality of light emitting elements of the light source part.

7. The head-up display device according to claim 1, wherein
the condenser lens is a lens array consisting of the plurality of smooth convex shapes in which lens elements are arranged, and a number of the lens elements is the same as a number of the light emitting elements of the light source part.

8. The head-up display device according to claim 7, wherein
the lens elements are arranged to face the corresponding light emitting elements, respectively, and each of the lens elements has a first refraction side facing the light source part as a single plane common among the lens elements and a second refraction side facing the liquid crystal panel and consisting of the plurality of smooth convex shapes.

9. The head-up display device according to claim 1, wherein
the refraction side of the condenser lens has a plurality of directly abutted smooth convex shapes.

10. A head-up display device that displays a virtual image by projecting a picture to a projection component to be viewable by an occupant in a movable body, the head-up display device comprising:
a light source part which emits light source light;
a liquid crystal panel integrally having a pair of polarizers for liquid crystals and a liquid crystal layer disposed between the polarizers in a stacked state, to form the picture by making a part of the light source light to pass through;
an additional polarizer arranged in an optical path between the light source part and the liquid crystal panel;
a condenser lens arranged in the optical path between the light source part and the liquid crystal panel to condense the light source light;
a field lens arranged in the optical path between the light source part and the liquid crystal panel, the field lens including a Fresnel lens having a composite optical surface; and
a diffusion part arranged in the optical path between the light source part and the liquid crystal panel to diffuse the light source light, wherein the additional polarizer and the pair of polarizers for liquid crystals have properties of transmitting polarized light along a transmission axis and shielding polarized light along a shielding axis which intersects the transmission axis,
the additional polarizer is arranged such that the transmission axis and the shielding axis respectively match with those of a polarizer for liquid crystals adjacent to the light source part, of the pair of polarizers for liquid crystals,
the additional polarizer is a reflection type polarizer which reflects the polarized light along the shielding axis toward the light source part,
the condenser lens, the field lens, the diffusion part, and the additional polarizer are arranged in this order from a side of the light source part in the optical path between the light source part and the liquid crystal panel,
the condenser lens has a refraction side facing the liquid crystal panel, and the refraction side of the condenser lens has a plurality of directly abutted smooth convex shapes having side surfaces directly contacting each other, and
the additional polarizer is located more adjacent to the liquid crystal panel than the condenser lens and the diffusion part.

11. The head-up display device according to claim 10, wherein
the additional polarizer is arranged in the optical path between the diffusion part and the liquid crystal panel.

12. The head-up display device according to claim 10, wherein
the additional polarizer is attached to the liquid crystal panel.

13. The head-up display device according to claim 10, wherein
the additional polarizer is a wire grid polarizer having a plurality of metal wires arranged in parallel at a predetermined pitch.

14. The head-up display device according to claim 13, wherein
the plurality of metal wires includes a plurality of aluminum wires.

15. The head-up display device according to claim 13, wherein
the predetermined pitch is less than a wavelength of the light source part.

16. The head-up display device according to claim 13, wherein
a stretching direction of the plurality of metal wires corresponds to the transmission axis and an arrangement direction of the plurality of metal wires corresponds to the shielding axis.

* * * * *